United States Patent
Lee et al.

(10) Patent No.: US 9,992,439 B2
(45) Date of Patent: Jun. 5, 2018

(54) DISPLAY APPARATUS, CONTROLLING METHOD, AND DISPLAY SYSTEM

(71) Applicant: SAMSUNG ELECTRONICS CO., LTD., Suwon-si (KR)

(72) Inventors: Jin-hee Lee, Ansan-si (KR); Bong-su Kim, Suwon-si (KR); Joon-young Ahn, Seongnam-si (KR); Kun-hee Jo, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/736,891

(22) Filed: Jun. 11, 2015

(65) Prior Publication Data
US 2016/0127673 A1   May 5, 2016

(30) Foreign Application Priority Data
Oct. 30, 2014   (KR) .................. 10-2014-0149427

(51) Int. Cl.
*H04B 5/00* (2006.01)
*H04N 5/44* (2011.01)
*H04N 21/422* (2011.01)
*H04N 21/4363* (2011.01)
*H04W 8/00* (2009.01)

(52) U.S. Cl.
CPC ..... *H04N 5/4403* (2013.01); *H04N 21/42207* (2013.01); *H04N 21/43637* (2013.01); *H04W 8/005* (2013.01); *H04N 2005/4407* (2013.01); *H04N 2005/4426* (2013.01)

(58) Field of Classification Search
CPC .................. H04N 5/4403; H04N 2005/4426
USPC ...................................... 455/41.1, 41.2, 41.3
See application file for complete search history.

(56) References Cited

U.S. PATENT DOCUMENTS

| 7,590,412 | B2* | 9/2009 | Sakamoto | H04H 60/80 455/151.2 |
| 2004/0192206 | A1* | 9/2004 | Hirvonen | H04M 1/7253 455/41.2 |
| 2005/0257052 | A1* | 11/2005 | Asai | H04L 63/105 713/166 |
| 2006/0258291 | A1* | 11/2006 | Nakata | H04L 1/1825 455/67.11 |

(Continued)

FOREIGN PATENT DOCUMENTS

EP    2355563 A1    8/2011

OTHER PUBLICATIONS

Anonymous, "The Crux of finding an HID proxy-capable USB bluetooth adapter", Feb. 21, 2014, XP 055249121, 8 pages total, http://www.0xf8.org/2014/02/the-crux-of-finding-a-hid--proxy-capable-usb-bluetooth-adapter/.

(Continued)

*Primary Examiner* — Md Talukder
(74) *Attorney, Agent, or Firm* — Sughrue Mion, PLLC (57) ABSTRACT

A display apparatus, a controlling method thereof, and a display system are provided. The display apparatus includes a power supply unit and a processor configured to, in response to AC power being applied through the power supply unit, search a connectable control device, determine a pairing history regarding the searched control device, in response to determining that there is no pairing history regarding the searched control device, boot the display apparatus, and perform pairing with the searched control device.

16 Claims, 8 Drawing Sheets

(56) References Cited

U.S. PATENT DOCUMENTS

| | | | | |
|---|---|---|---|---|
| 2009/0033748 A1* | 2/2009 | Ejima | ................ | H04N 1/00347 348/207.1 |
| 2011/0117842 A1* | 5/2011 | Hong | ................ | H04M 1/7253 455/41.2 |
| 2011/0183660 A1* | 7/2011 | Choi | ................ | H04L 51/14 455/422.1 |
| 2011/0250932 A1* | 10/2011 | Cohen | ................ | H04R 1/1016 455/569.1 |
| 2012/0020265 A1* | 1/2012 | Wu | ................ | G06F 1/3209 370/311 |
| 2013/0050073 A1* | 2/2013 | Bae | ................ | H04N 21/4126 345/156 |
| 2013/0129358 A1* | 5/2013 | Jung | ................ | H04B 10/1141 398/112 |
| 2014/0019304 A1* | 1/2014 | Lee | ................ | G06Q 10/00 705/26.81 |
| 2014/0049909 A1* | 2/2014 | Zhu | ................ | G06F 1/1654 361/679.55 |
| 2014/0094198 A1* | 4/2014 | Heo | ................ | H04W 52/0274 455/456.4 |
| 2014/0196023 A1* | 7/2014 | Bouthillier | ................ | G06F 8/61 717/178 |
| 2015/0044970 A1* | 2/2015 | Park | ................ | H04M 1/7253 455/41.2 |
| 2015/0138444 A1* | 5/2015 | Hirabayashi | ................ | H04N 5/4403 348/734 |
| 2016/0127673 A1* | 5/2016 | Lee | ................ | H04N 5/4403 348/734 |
| 2016/0232782 A1* | 8/2016 | Lee | ................ | G08C 17/02 |
| 2016/0248964 A1* | 8/2016 | Okamoto | ................ | G03B 17/561 |

OTHER PUBLICATIONS

Anonymous; "List of Bluetooth profiles", Oct. 26, 2014; XP 055249102, 15 pages total, https://en.wikipedia.org/w/index.php?title-List_of_Bluetooth_profiles &oldid=631128572#Human_Interface_Device_Profile_.28HID.29.

Communication issued Feb. 19, 2016, issued by the European Patent Office in counterpart European Patent Application No. 15186940.1.

Communication issued Aug. 29, 2017 by the European Patent Office in counterpart European Patent Application No. 15186940.1.

* cited by examiner

DISPLAY APPARATUS, CONTROLLING METHOD, AND DISPLAY SYSTEM

CROSS-REFERENCE TO RELATED APPLICATION(S)

This application claims priority from Korean Patent Application No. 10-2014-0149427, filed on Oct. 30, 2014, in the Korean Intellectual Property Office, the entire disclosure of which is incorporated herein by reference.

BACKGROUND

1. Field

Apparatuses and methods consistent with exemplary embodiments relate to a display apparatus, a controlling method thereof, and a display system, and more particularly, to a display apparatus which performs Bluetooth communication without an Infrared (IR) receiver, as well as a controlling method and a display system thereof.

2. Description of Related Art

Recently, a control device such as a remote processor or remote controller which controls a display apparatus may transmit a user's control command to a display apparatus through an infrared (IR) signal and also through various other methods. For example, a remote processor which transmits a control command using a near field communication method such as Bluetooth communication may transmit a control command easily even if there are obstacles between a display apparatus and the remote processor.

Because of these advantages, a control device using a near field communication method is frequently used. However, a control device using near field communication requires pairing with a display apparatus when initially connected to the display apparatus because two devices must typically recognize addresses of one another in order to be interconnected. Therefore, to perform a pairing operation, an IR signal is required to boot the display apparatus.

In other words, the display apparatus typically requires a separate IR signal receiver to receive an IR signal which is used only to boot the display apparatus to perform an initial pairing operation. Accordingly, a method for using a remote processor which uses near field communication only, such as Bluetooth, without using an IR signal is desired.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments relate to a display apparatus capable of performing Bluetooth pairing without an IR receiver.

According to an aspect of an exemplary embodiment, provided is a display apparatus including a power supply and a processor configured to, in response to AC power being applied through the power supply, search for a connectable control device, determine a pairing history of a found control device, in response to determining that there is no pairing history of the found control device, boot the display apparatus and perform pairing with the found control device.

In response to determining that there is a pairing history of the found control device, the processor may boot the display apparatus in response to a booting command being input through the searched control device.

The display apparatus may further include a display, and the processor may control the display to display a user interface (UI) indicating that the display apparatus is performing pairing with the found control device while the display apparatus is being booted.

The processor may include a sub processor and a main processor, and in response to AC power being applied to the display apparatus through the power supply, the sub processor may transmit information on a pairing history of the found control device to the main processor, and in response to determining that there is no pairing history of the found control device based on the information received from the sub processor, the main processor may control to boot the display apparatus.

The found control device may be a Bluetooth remote processor, and the processor may perform a Bluetooth pairing with the found control device to perform Bluetooth communication.

According to an aspect of another exemplary embodiment, provided is a controlling method of a display apparatus including, in response to AC power being applied to the display apparatus, searching for a connectable control device, in response to determining that there is no pairing history of a found control device, booting the display apparatus and performing pairing with the found control device.

The booting may include, in response to determining that there is a pairing history of the found control device, booting the display apparatus in response to a booting command being input through the found control device.

The booting may include displaying a user interface (UI) indicating that the display apparatus is performing pairing with the searched control device while the display apparatus is being booted.

The booting may include, in response to AC power being applied to the display apparatus, applying power to a sub processor, transmitting, by the sub processor, information about the pairing history of the searched control device to a main processor, and in response to the main processor receiving information that there is no pairing history of the found control device from the sub processor, booting, by the main processor, the display apparatus.

The control device may be a Bluetooth remote processor, and the performing of the pairing may include performing Bluetooth pairing to perform Bluetooth communication with the found control device.

According to an aspect of another exemplary embodiment, provided is a display system including a control device configured to control an electronic apparatus via Bluetooth communication, and a display apparatus configured to search for a connectable control device in response to AC power being applied, determine a pairing history of a found control device, in response to determining that there is no pairing record of the searched control device in the pairing history, perform booting and perform pairing with the found control device.

In response to determining that there is a pairing of the found control device, the display apparatus may perform booting in response to a booting command being input through the found control device.

In response to AC power being applied for the first time, the display apparatus may store information indicating that there is no pairing history of a control device, and in response to the connectable control device being searched for, may perform booting according to the stored information.

The control device may be a Bluetooth remote processor, and the display apparatus may perform Bluetooth pairing with the control device.

According to one or more of the various exemplary embodiments, a user may use a display apparatus capable of performing Bluetooth pairing, a controlling method thereof, and a display system without an IR receiver.

BRIEF DESCRIPTION OF THE DRAWINGS

The above and/or other aspects will be more apparent by describing certain exemplary embodiments with reference to the accompanying drawings, in which.

DETAILED DESCRIPTION

One or more exemplary embodiments may vary, and may be provided in different exemplary embodiments. Specific exemplary embodiments are further described with reference to accompanying drawings and detailed explanation. However, this should not be construed as limiting the scope of the exemplary embodiments to a specific form. Instead, modifications, equivalents and replacements included in the disclosed concept and technical scope of this specification may be employed. While describing certain exemplary embodiments, if it is determined that a specific description regarding a known technology would obscure the gist of the invention with unnecessary detail, the specific description is omitted.

In the present disclosure, relational terms such as first, second, and the like, may be used to distinguish one entity from another entity, without necessarily implying any actual relationship to or an order between such entities.

The terms used in the following description are provided to explain specific exemplary embodiments and are not intended to limit the scope of the exemplary embodiments. A singular term may include a plural form unless it is intentionally written that way. Also, terms such as "include", "comprise", "is configured to", etc. of the description are used to indicate that there are features, numbers, steps, operations, elements, parts, or combination thereof, but they should not be understood as excluding the possibilities of combination or the addition of one or more features, numbers, steps, operations, elements, parts, or combination thereof.

In an exemplary embodiment, 'a module' or 'a unit' may perform at least one function or operation, and may be implemented as hardware, software, or combination thereof. In addition, a plurality of 'modules' or a plurality of 'units' may be integrated into at least one module and may be implemented as at least one processor except for 'modules' or 'units' that should be implemented in a specific hardware.

Figure 1:
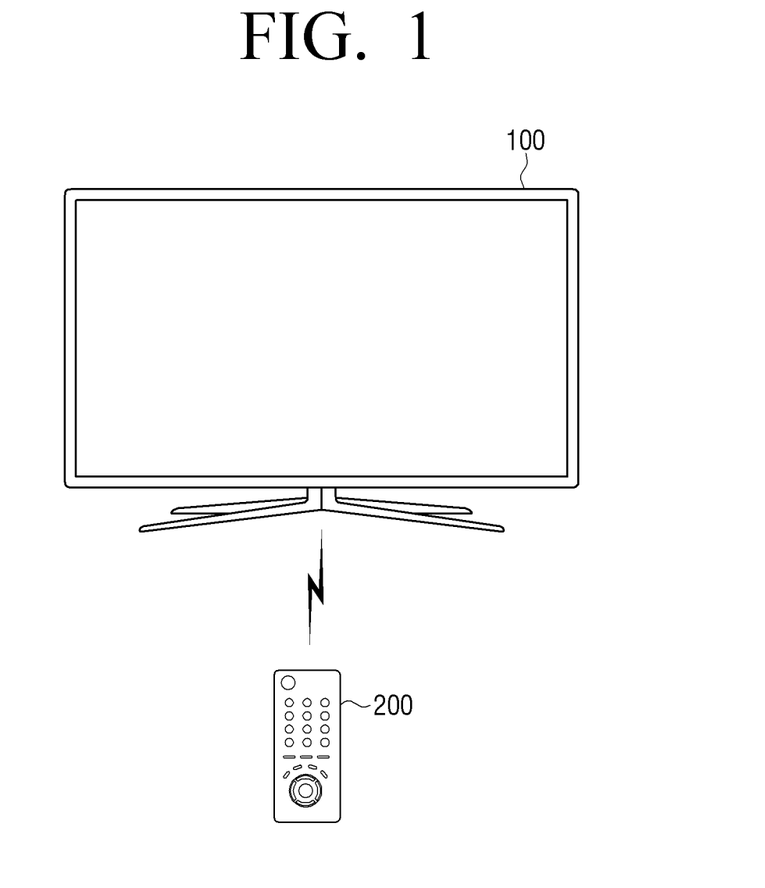
FIG. 1 is a diagram illustrating a display system according to an exemplary embodiment.

FIG. 1 is a diagram illustrating a display system 1000 according to an exemplary embodiment. As illustrated in FIG. 1, the display system 1000 includes a display apparatus 100 and a control device 200. In this example, the display system 1000 includes one display apparatus 100 and one control device 200, however, this is only an example. As another example, the display system 1000 may include a plurality of display apparatuses 100 and/or a plurality of control devices 200. In other words, there may be a plurality of control devices 200 to control a single display apparatus 100, and a single control device 200 may control a plurality of display apparatuses 100. Accordingly, the display system 1000 may include a plurality of display apparatuses 100 and control devices 200.

As illustrated in FIG. 1, the display apparatus 100 may be a television (TV), but this is only an example. It should be appreciated that the display apparatus may be implemented as various electronic apparatuses which are controllable by the control device 200, for example, a television, a mobile phone, a tablet PC, a digital camera, a camcorder, a notebook PC, a desktop PC, a PDA, an MP3 player, an appliance, and the like.

The control device 200 controls the display apparatus 100. For example, the control device 200 may include a plurality of sensors, an input unit, a communication unit, and the like, and may transmit, to the display apparatus 100, a user command which is input to control the display apparatus 100. For example, the control device 200 may include a Bluetooth module, and may perform communication with the display apparatus 100 through Bluetooth communication.

Hereinafter, example configurations of the display apparatus 100 and the control device 200 that may be included in the above-mentioned display system 1000 are described.

Figure 2:
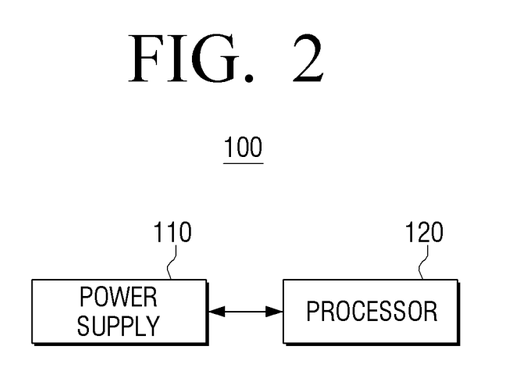
FIG. 2 is a block diagram illustrating a configuration of a display apparatus according to an exemplary embodiment.

FIG. 2 is a block diagram illustrating a configuration of the display apparatus 100 according to an exemplary embodiment. As illustrated in FIG. 2, the display apparatus 100 includes a power supply 110 and a processor 120.

The power supply 110 supplies power to the display apparatus 100. For example, the power supply 110 may supply external AC power to the display apparatus 100.

For example, a place where the display apparatus 100 may be used, such as a house or an office, generally has an electric outlet for supplying electric power to various electronic apparatuses. Accordingly, when a plug included in the display apparatus 100 is inserted into the electric outlet, the power supply 110 may supply external AC power to the display apparatus 100. However, the example of inserting a plug of the display apparatus 100 into the electric outlet and providing external power to the display apparatus 100 by the power supply 110 is only an example. As another example, the power supply 110 may supply power to the display apparatus 100 using a battery which is built in or connected to the display apparatus 100 or using a connectable external power supply device.

Meanwhile, the processor 120 controls overall operations of the display apparatus 100. For example, the processor 120 may search for a connectable control device when AC power is supplied through the power supply 110. For example, the processor 120 may search for a control device that the display apparatus 100 may connect with. For example, the control device may be or may include a remote processor, remote controller, keyboard, mouse, touch pad, joystick, motion detector, speech recognizer, and the like.

The processor 120 may determine a pairing record of the searched control device, and if it is determined that there is no pairing record for the searched control device based on the pairing history, may boot the display apparatus 100. For example, the processor 120 may search for and find at least one remote control device. In response to finding the remote control device, the processor may check a pairing history of the found remote control device.

According to one or more exemplary embodiments, if there is no pairing record of the searched control device, the processor may supply power to each element of the display apparatus 100 and boot an Operating System (O/S) for driving the display apparatus 100 even if a booting command is not input by a user. When the booting is completed, the processor 120 of the display apparatus 100 may perform pairing with the searched control device. Here, the processor 120 may enter into a normal mode.

Meanwhile, if it is determined that there is a pairing record of the searched control device, the processor may wait to boot the display apparatus 100 until a booting command is input through the searched control device.

For example, the control device which is searched for by the processor 120 through the above-described method may be a Bluetooth remote processor which may be used to control the display apparatus 100 using Bluetooth communication. Accordingly, the processor 120 may perform Bluetooth pairing with the searched control device to perform Bluetooth communication therebetween.

Figure 3:
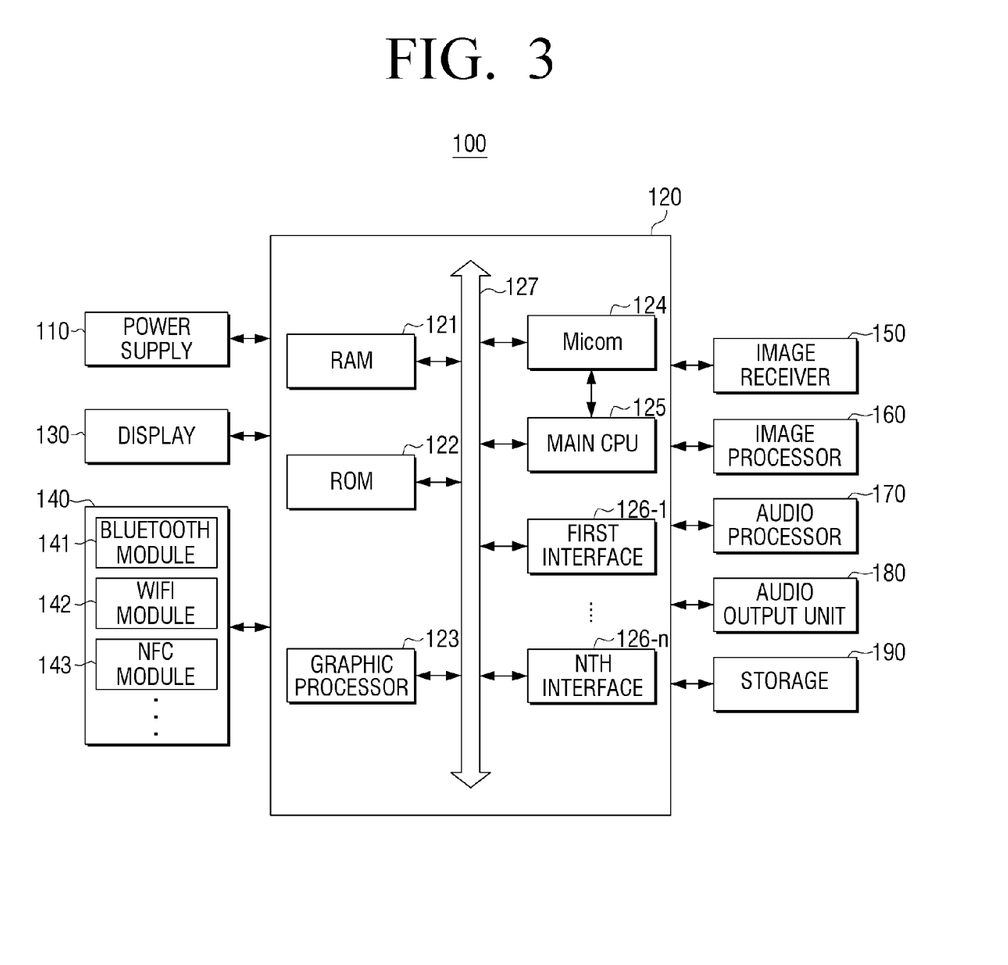
FIG. 3 is a block diagram illustrating a configuration of a display apparatus according to another exemplary embodiment.

Hereinafter, another example of a configuration of the display apparatus 100 is described in detail with reference to FIG. 3. As illustrated in FIG. 3, the display apparatus 100 further includes a display 130, a communicator 140, an image receiver 150, an image processor 160, an audio processor 170, an audio output unit 180, and a storage 190 in addition to the power supply 110 and the processor 120.

FIG. 3 illustrates an example in which the display apparatus 100 includes various functions such as a communication function including Bluetooth communication, a standby function, an instant booting function, a speech recognition function, a video play function, a display function, and the like. Accordingly, it should be appreciated that one or more of the elements may be omitted or changed, or other elements may be further added. The description of elements which are already provided above with respect to FIG. 2 will be omitted.

In the example of FIG. 3, the display 130 displays an image. For example, the display 130 may display content such as at least one of a video frame which is generated as the image processor 160 processes image data received from the image receiver 150 and various screens generated by a graphic processor 123 included in the processor 120.

In addition, the display 130 may display a content which is received through a broadcast channel. For example, the display apparatus 100 may receive various broadcast signals transmitted from a broadcasting station through an RF communication network, receive contents from various servers through an IP network, and the like, and display the received contents.

The display 130 may also display various User Interfaces (UIs). For example, the display 130 may display a UI indicating that the display apparatus 100 is performing a pairing operation with a searched for and found control device while booting the display apparatus 100. As another example, if it is determined that there is no pairing record for a control device based on a pairing history, cold booting may be performed. In this example, the display 130 may display a UI informing a user that the display apparatus 100 is being booted in order to be paired with a control device. As another example, the display 130 may display a UI including a list of control devices that are connected to the display apparatus 100 through various communication methods such as Bluetooth communication.

Meanwhile, the communicator 140 performs communication with various types of external apparatuses including the control device 200 or various external servers, according to various types of communication methods. Accordingly, the communicator 140 may include various types of communication modules, and may perform communication with external apparatuses and external servers.

For example, as illustrated in FIG. 3, the communicator 140 may include a Bluetooth module 141, a WiFi module 142, an NFC module 143, and the like. However, this is only for purposes of example, and it should be appreciated that the communicator 140 may further include various communication modules such as a wireless communication module.

Here, the Bluetooth module 141, the WiFi module 142, and the NFC module 143 may perform communication according to a Bluetooth method, a WiFi method, and an NFC method, respectively. The NFC module represents a chip which operates according to an NFC method and which uses 13.56 MHz band among various RF-ID frequency bands such as 135 kHz, 13.56 MHz, 433 MHz, 860~960 MHz, 2.45 GHz, and so on. In the case of using the Bluetooth module 141 or the WiFi module 142, various connection information such as a service set identifier (SSID) and a session key may be transmitted/received first for establishing a communication connection, and then, various information may be transmitted/received. The wireless communication module represents a module which performs communication according to various communication standards such as IEEE, Zigbee, $3^{rd}$ Generation (3G), $3^{rd}$ Generation Partnership Project (3GPP), Long Term Evolution (LTE), and the like.

According to one or more exemplary embodiments, the display apparatus 100 may communicate with a control device such as a Bluetooth remote processor through the Bluetooth module 141. In other words, the display apparatus 100 may receive a user command which is input from a Bluetooth remote processor through the Bluetooth module 141.

The image receiver 150 receives image data through various sources. For example, the image receiver 150 may receive broadcast data from an external broadcasting station, receive image data from an external server, in real time, and receive image data stored in the internal storage 190.

The image processor 160 processes image data received by the image receiver 150. For example, the image processor 160 may perform various image processing operations with respect to image data, such as decoding, scaling, noise filtering, frame rate conversion, resolution conversion, and the like.

The audio processor 170 processes audio data. For example, the audio processor 170 may perform various processing with respect to audio data, such as decoding, amplification, noise filtering, and the like. The audio data processed by the audio processor 240 may be output to the audio output unit 180.

The audio output unit 180 may output not only various audio data but also various alarm sounds or voice messages which are processed by the audio processor 170. Here, the audio output unit 180 may be implemented as a speaker, but this is only an example. As another example, the audio output unit 180 may be an audio terminal.

The storage stores various modules that may be used to drive the display apparatus 100. For example, the storage 190 may store software including a base module, a sensing module, a communication module, a presentation module, a web browser module, and a service module. In this example, the base module refers to a basic module which processes a signal transmitted from each hardware included in the display apparatus 100, and transmits the processed signal to an upper layer module. The sensing module collects information from various sensors, and analyzes and manages the collected information. For example, the sensing module may include a face recognition module, a voice recognition module, a motion recognition module, an NFC recognition module, and the like. The presentation module may compose a display screen. The presentation module may include a multimedia module for reproducing and outputting multimedia contents, and a UI rendering module for UI and graphic processing. The communication module may perform communication with an outside device or apparatus. Also, the service module may include various applications for providing various services.

As described herein, the storage 190 may include various program modules, however, one or more of the various program modules may be omitted or changed. Also, new modules may be added according to the type and characteristics of the display apparatus 100. For example, if the display apparatus 100 is a smart phone, the base module may include a location determination module to determine a GPS-based location, and the sensing module may further include a sensing module to detect a user's operation.

In this example, the processor 120 controls the overall operations of the display apparatus 100 using various programs stored in the storage 190. For example, if AC power is applied through the power supply 110, the processor 120 may search for a connectable control device.

In response to finding a control device, the processor 120 may determine a pairing history of the found control device. For example, if the control device is determined not to have a pairing record based on the pairing history, the processor 120 may boot the display apparatus 100. In other words, even though a power-on command or a booting command is not input by a user, if there is no pairing record of the searched control device, the processor 120 may apply power to each element of the display apparatus 100, and boot an O/S to drive the display apparatus 100. After the booting is completed, the processor 120 of the display apparatus 100 which enters into a normal mode may perform pairing with the searched control device. Meanwhile, if it is determined that the control device has a pairing record the processor 120 may control to boot the display apparatus 100 when a booting command is input by a user through the searched control device. During pairing, the processor 120 may control the display 130 to display a UI indicating that the display apparatus 100 is performing pairing with the searched control device.

Meanwhile, in some examples the processor 120 may include a main processor and a sub processor. In this example, the main processor refers to a main CPU, and a sub processor may control the display apparatus 100 in a standby mode in which power is applied and store various information about the booting of the display apparatus 100.

For example, as illustrated in FIG. 3, the processor 120 includes a RAM 121, a ROM 122, a graphic processor 123, a Micom 124, a main CPU 125, a first to an nth interface 126-1~126-n, and a bus 147. In this example, the RAM 121, the ROM 122, the graphic processor 123, the Micom 124, the main CPU 125, the first to the nth interface 126-1~126-n, and the like, may be interconnected through the bus 146.

The ROM 122 may store a set of commands for system booting. If a turn-on command is input, and thus, power is supplied, the main CPU 125 copies an O/S stored in the storage 190 in the RAM 121 according to a command stored in the ROM 122, and boots a system by executing the O/S. When the booting is completed, the main CPU 125 may copy various application programs stored in the storage 190 in the RAM 121, and execute the application programs copied in the RAM 121 to perform various operations.

The graphic processor 123 generates a screen that may include various objects such as a pointer, an icon, an image, a text, etc. using a computing unit (not shown) and a rendering unit (not shown). The computing unit computes property values such as coordinates, shape, size, and color of each object that is to be displayed according to the layout of the screen using a control command received from an input unit. The rendering unit generates a screen with various layouts including objects based on the property values computed by the computing unit. The screen generated by the rendering unit may be displayed in a display area of the display 130. For example, the graphic processor 123 may generate an external apparatus list and a content list according to a user command.

The main CPU 125 accesses the storage 190, and performs booting using the O/S stored in the storage 190. Also, the main CPU 125 may perform various operations using various programs, contents, data, etc. stored in the storage 190.

The first to the nth interface 126-1~126-n may be connected to the above-described various elements. For example, one or more of the above interfaces may be a network interface which is connected to an external apparatus via a network such as the Internet.

Also, if AC power is applied to the display apparatus 100 through the power supply 110, the Micom 124 may be turned on. For example, when the display apparatus 100 is shipped out from a factory and is connected to AC power for a first time, the Micom 124 may store information, 'flag=1'. In other words, when the Micom 124 has never been paired with a control device, the information of 'flag=1' which indicates that the Micom has never been paired with any control device may be set and stored.

When power is applied to the main CPU 125, the Micom 124 and the main CPU 125 may perform communication by exchanging data therebetween. Accordingly, information about the 'flag=1' stored in the Micom 124 may be transmitted to the main CPU 125.

The main CPU 125 which receives the information about the 'flag=1' may perform cold booting with respect to the display apparatus 100. In other words, to perform Bluetooth pairing with a control device, the main CPU 125 may control to boot the display apparatus 100 so that Bluetooth pairing may be performed with the control device even though a power-on command regarding the display apparatus 100 is not input. Accordingly, using the display apparatus 100, Bluetooth pairing may be performed between a Bluetooth remote processor and the display apparatus 100 even without an operation of transmitting an IR signal from the Bluetooth remote processor to turn on the display apparatus 100 being received.

Figure 4:
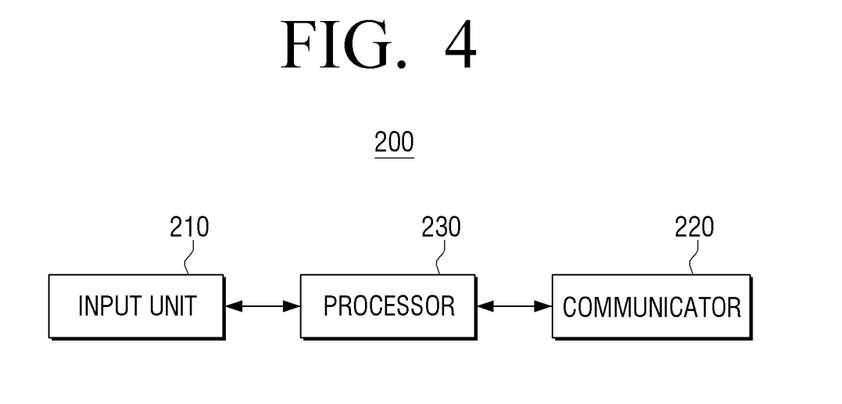
FIG. 4 is a block diagram illustrating a configuration of a control device according to an exemplary embodiment.

FIG. 4 is a block diagram illustrating a configuration of the control device 200 according to an exemplary embodiment. The control device 200 includes an input unit 210, a communicator 220, and a processor 230. As an example, the control device 200 may be a remote processor or remote controller which transmits a control command to the display apparatus 100 through Bluetooth communication, but this is only an example. For example, the control device 200 may be implemented as any electronic apparatus which may transmit a control command to a display apparatus through various communication methods including Bluetooth communication.

The input unit 210 receives a user command. In other words, the input unit 210 may receive a user command to enable the user to control the display apparatus 100. For example, the input unit 210 may include a power button, volume up/down buttons, channel up/down buttons, number buttons, etc. Meanwhile, while the input unit 210 may include a plurality of buttons and/or keys, the input unit 210 may also include or be implemented in various forms such as a touch pad, a toggle key, a mouse, a sensor, a motion recognizer, a speech recognizer, and the like.

The communicator 220 performs communication with an external electronic apparatus. The communication unit 220 may transmit a user command input through the control device 200 to the display apparatus 100. According to an aspect of an exemplary embodiment, the communicator 220 may include a Bluetooth module (not illustrated) that may perform Bluetooth communication with the display apparatus 100 and that may transmit a user command to the display apparatus 100 via the Bluetooth communication. For example, the communicator 220 of the control device 200 may communicate with the communicator 130 of the display apparatus 100.

Meanwhile, the processor 230 controls the overall operations of the control device 200. In other words, when the display apparatus 100 is cold-booted for Bluetooth pairing, the processor 230 may control the control device 200 such that the control device 200 performs Bluetooth pairing with the display apparatus 100.

Hereinafter, an example of a the method of performing Bluetooth pairing between the display apparatus 100 and the control device 200 is described with reference to FIGS. 5A and 5B. In this example, a Bluetooth remote processor is the control device 200 and transmits a user command to the display apparatus 100 through Bluetooth communication.

Figure 5A:
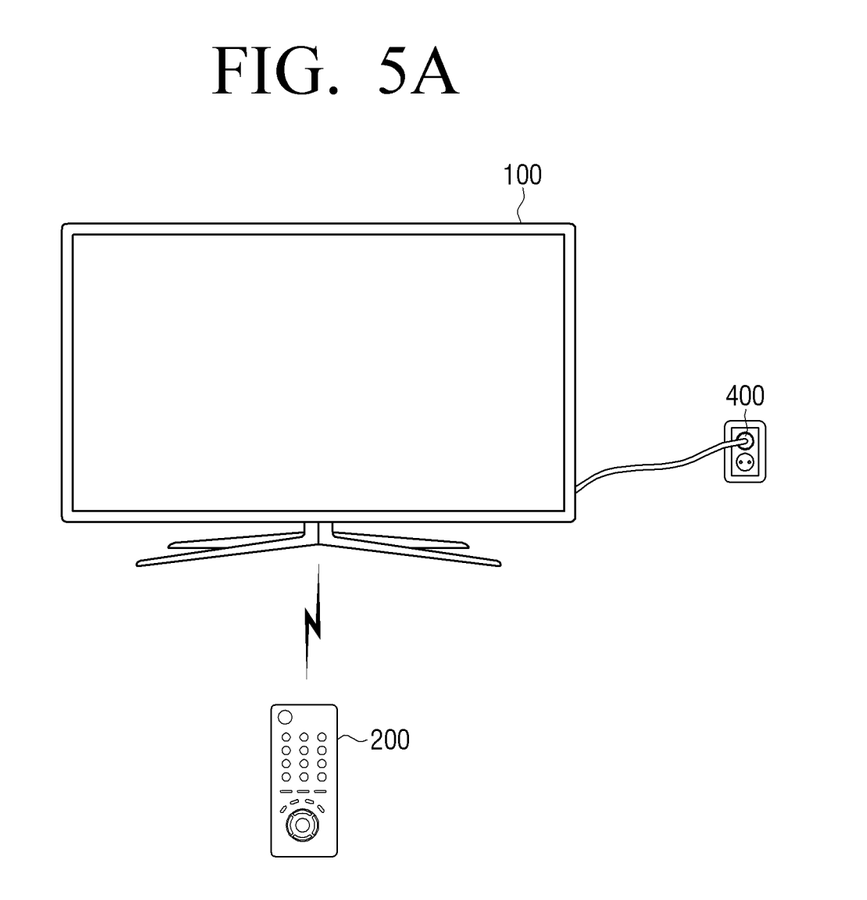
FIGS. 5A and 5B are diagrams illustrating an example of a Bluetooth pairing method of a display system according to an exemplary embodiment.

FIG. 5A illustrates that AC power 400 may be applied to the display apparatus 100 controllable by the control device 200. For example, when the display apparatus 100 is installed in a space such as a house or an office for the first time, a plug of the display apparatus 100 may be inserted into an electric outlet and the AC power 400 may be applied as illustrated in FIG. 5A. In this example, one or more components of the display apparatus 100 may power on, while one or more components remain powered off.

For example, as illustrated in FIG. 5A, when the AC power 400 is applied to the display apparatus 100, the Micom 124, the main CPU 125, the Bluetooth module 141, etc. of the display apparatus 100 may be turned on, while other components such as one or more of the display 130, the image receiver 150, the image processor 160, the audio processor 170, and the audio output unit 180 may remain powered off.

When the display apparatus 100 is first shipped out from a factory and is connected to AC power for the first time, the Micom 124 may store information indicating that the display apparatus is not connected to or otherwise paired with a control device such as a remote controller. For example, the display apparatus 100 may set a variable 'flag=1' to indicate that the display apparatus has not paired with a control device. In other words, because the Micom 124 has never been paired with a control device, the information of 'flag=1' which indicates that the Micom has never been paired with any control device may be stored.

When power is applied to the main CPU 125, the Micom 124 and the main CPU 125 may perform communication by exchanging data. Accordingly, the information indicating that the display apparatus 100 has not paired with a control device (i.e. 'flag=1') stored in the Micom 124 may be transmitted to the main CPU 125.

According to an aspect of an exemplary embodiments, the main CPU 125 which receives the information of 'flag=1' performs cold booting with respect to the display apparatus 100. In other words, in order to perform Bluetooth pairing with a control device, the main CPU 125 may control to boot the display apparatus 100 so that Bluetooth pairing may be performed with the control device even if a power-on command regarding the display apparatus 100 has not input. Upon cold booting, the remaining components of the display apparatus 100 may be powered on, for example, the one or more of the display 130, the image receiver 150, the image processor 160, the audio processor 170, and the audio output unit 180.

When the booting is completed, power is now applied to all hardware elements included in the display apparatus 100, and O/S is executed. In addition, after the booting is completed, the display apparatus 100 may execute Bluetooth pairing with the control device 200. To inform a user that Bluetooth paring with the control device 200 is to be executed when the booting is completed, the display apparatus 100 may display a UI 410 as illustrated in FIG. 5B.

As a non-limiting example, the display apparatus 100 may display a message, "Welcome! Bluetooth remote controller is detected. Bluetooth pairing is under preparation". Accordingly, through the UI 410, the user may be made aware in advance that pairing with the Bluetooth remote processor is being executed at the same time when the booting is being performed or in response to booting being completed. Accordingly, the display apparatus 100 may simultaneously perform booting and Bluetooth pairing with a control device.

Figure 5B:
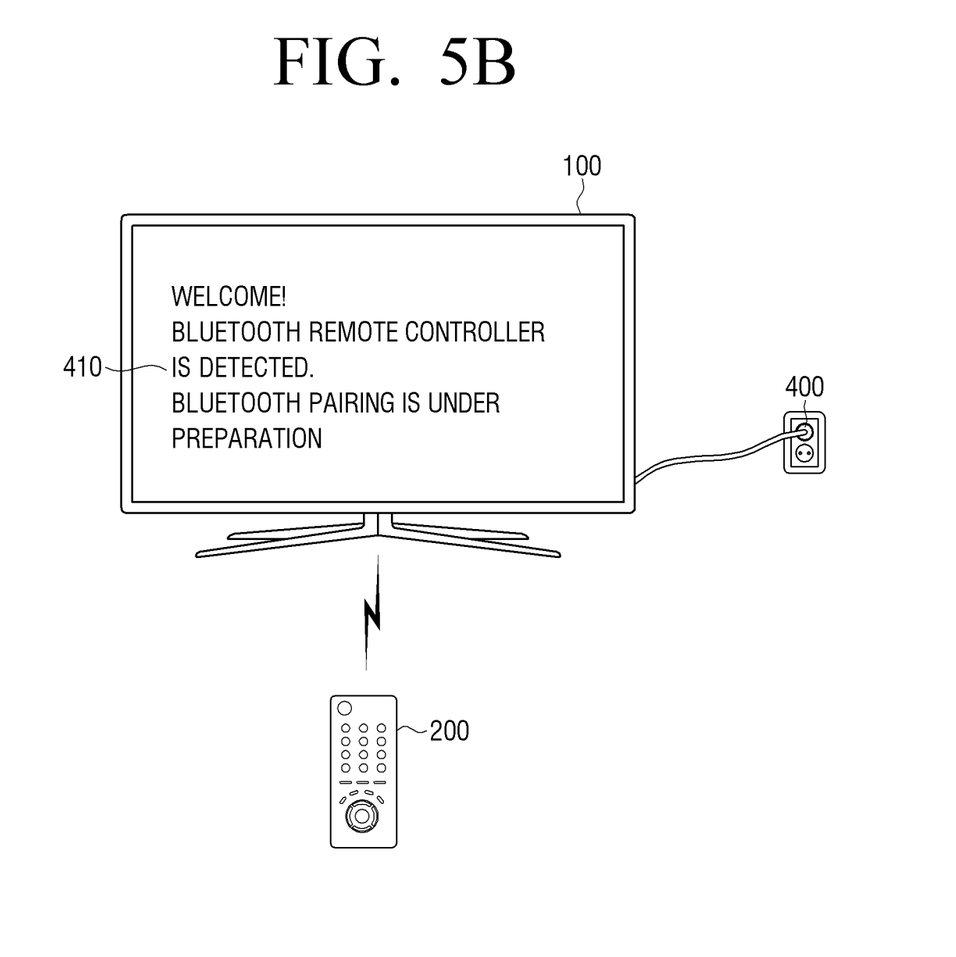

However, the UI 410 illustrated in FIG. 5B is merely an example, and it should be appreciated that the display apparatus 100 does not necessarily display a UI informing that pairing will be executed while the booting is being performed. Also, in the case of displaying a UI, the display apparatus 100 may display the UI in various forms other than the message illustrated in FIG. 5B.

According to various exemplary embodiments, when the booting of the display apparatus 100 is completed, Bluetooth pairing with the control device 200 may be performed without a separate user command. When the Bluetooth pairing with the control device 200 is executed, the flag information stored in the Micom 124 may be changed. For example, the previously stored flag information in the Micom 124 may be changed from 'flag=1' to 'flag=0'.

Accordingly, if Bluetooth pairing is executed, AC power regarding the display apparatus 100 may be removed and then applied again, the Micom 124 may transmit the information of 'flag=0' with respect to the main CPU 125 and thus, cold booting is not performed. In this example, the booting of the display apparatus 100 may be performed when a power-on command is input by the paired control device 200.

Figure 6:
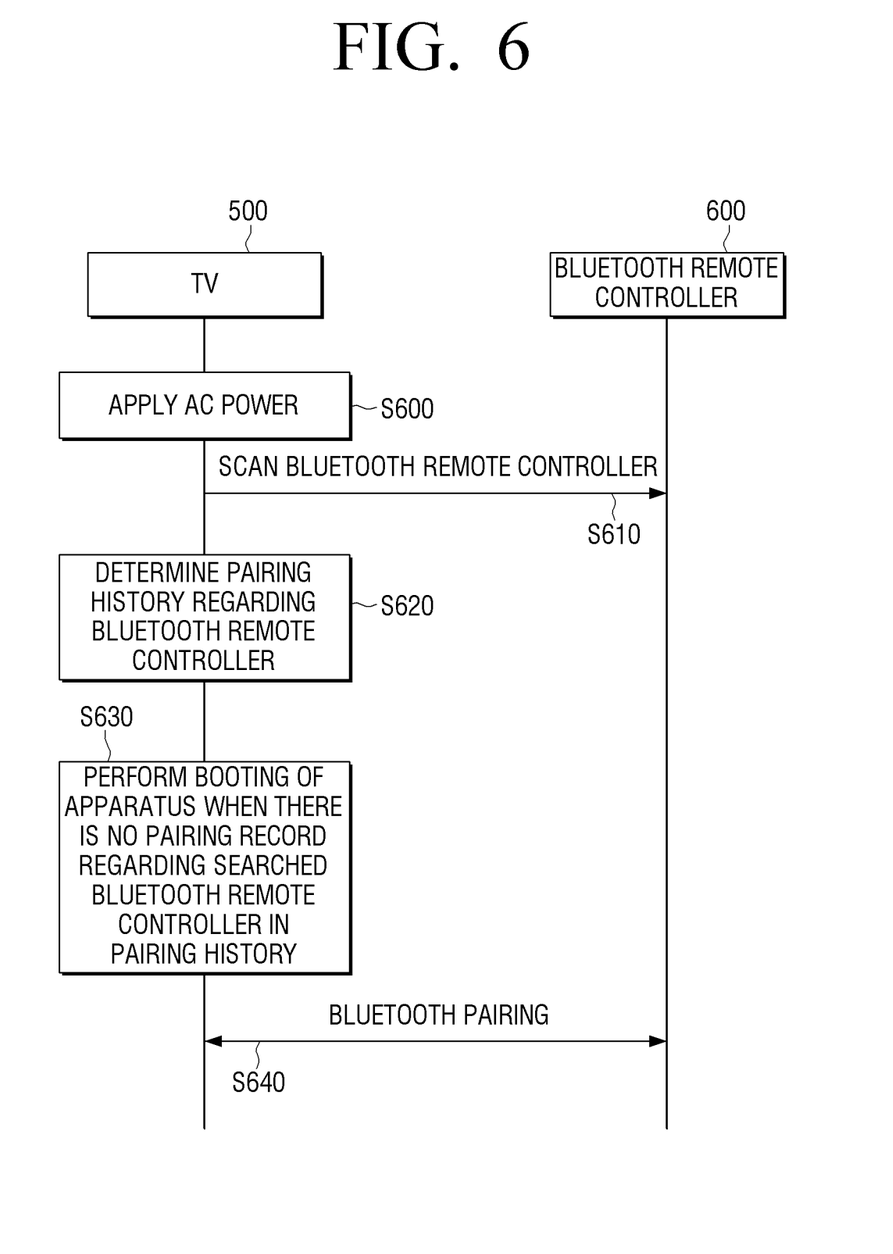
FIG. 6 is a diagram illustrating a Bluetooth pairing method of a display system according to an exemplary embodiment.

FIG. 6 is a diagram illustrating a Bluetooth pairing method of the display system 1000 according to an exemplary embodiment. In this example, the display apparatus is a TV 500.

Referring to FIG. 6, AC power is applied to a TV 500 (S600), and a Bluetooth remote processor 600 is scanned for (S610). In this case, the TV 500 may search for a potential control devices such as the Bluetooth remote processor 600 which is/are within a predetermined distance from the TV 500.

In this example, a Micom of the TV 500 may search a Bluetooth history of the searched Bluetooth remote processor 600, and determines a Bluetooth pairing record of the remote processor 600 (S620).

For example, the TV 500 which is shipped out from a factory for the first time may store the information of 'flag=1' in a Micom thereof. Accordingly, the Micom may determine that there is no record of Bluetooth pairing with the Bluetooth remote processor 600, and transmit information indicating that there is no Bluetooth pairing record, to a main CPU of the TV 500.

If there is no pairing record in the Bluetooth remote processor 600 which is searched from the pairing history, the TV 500 may boot the TV (S630). In other words, if the TV 500 has never been Bluetooth-paired with the searched Bluetooth remote processor 600, the Micom of the TV 500 may transmit the information of 'flag=1' to the main CPU of the TV 500. Accordingly, the main CPU of the TV 500 may apply power to all hardware elements of the TV 500, and perform the booting by executing O/S.

In this example, if the TV 500 has never been Bluetooth-paired with the searched Bluetooth remote processor 600, cold booting may be performed without a separate user command to turn of the TV 500, and Bluetooth pairing with the Bluetooth remote processor 600 may be executed.

Meanwhile, after the Bluetooth pairing with the Bluetooth remote processor 600 is completed, the main CPU of the TV 500 may change the information of 'flag=1' stored in the Micom to 'flag=0' and store the changed information. Accordingly, even if AC power is removed and then applied again, the TV 500 stores the information of 'flag=0' in the Micom and thus, cold booting may not be performed.

Figure 7:
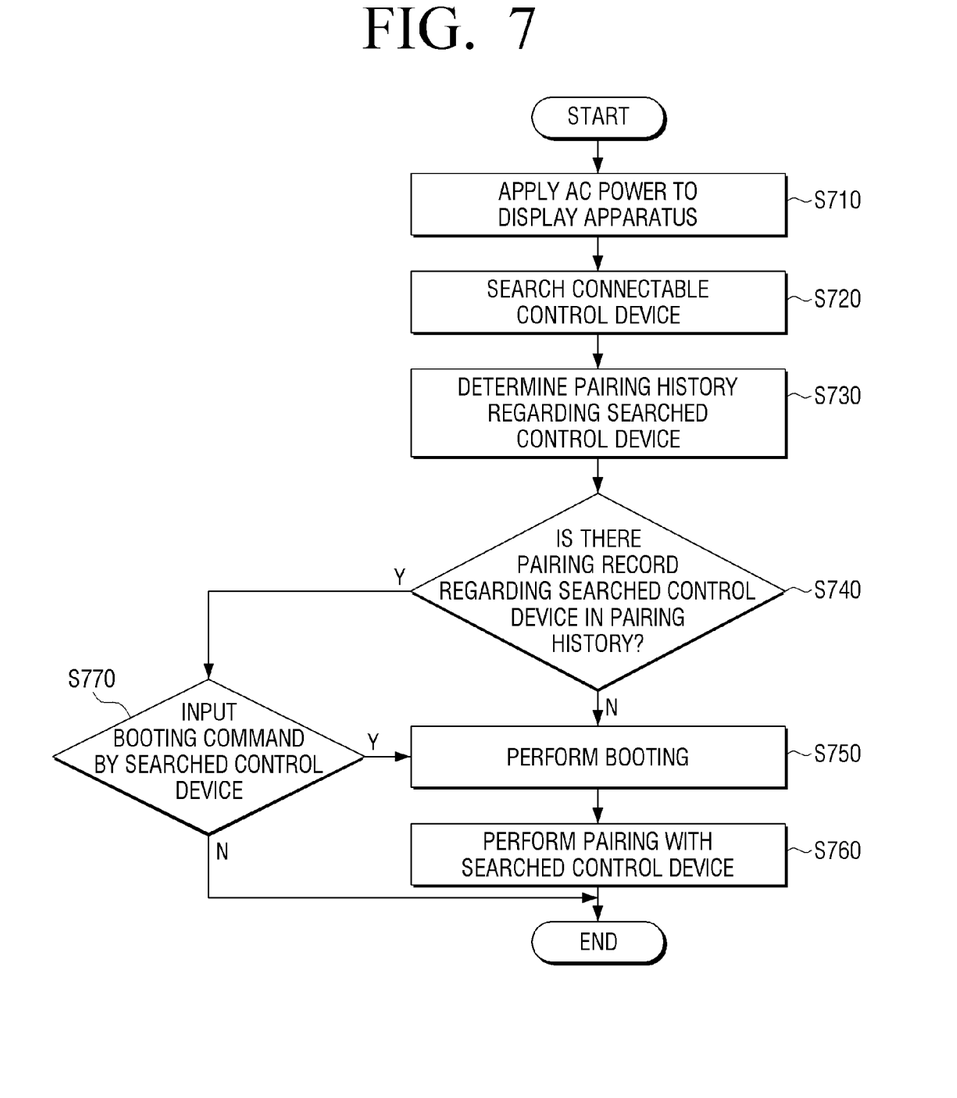
FIG. 7 is a flowchart illustrating a controlling method of a display apparatus according to an exemplary embodiment.

FIG. 7 is a flowchart illustrating a controlling method of the display apparatus 100 according to an exemplary embodiment.

Referring to FIG. 7, when AC power is applied to the display apparatus 100 (S710), the display apparatus 100 searches for a connectable control device (S720). In other words, the display apparatus 100 may search for a control device which may perform Bluetooth communication.

When a connectable control device is searched for and found, the display apparatus 100 determines a pairing history regarding the found control device (S730). If there is no pairing record regarding the searched control device in the pairing history (S740-N), the booting of the display apparatus 100 is executed (S750).

For example, if a control device which has never been paired with the display apparatus 100 is found or the display apparatus 100 has never been paired with a control device because AC power is being applied for the first time, for example, after the display apparatus 100 was shipped from a factory, the display apparatus 100 determines that there is no pairing record with the searched control device. Accordingly, the display apparatus 100 performs cold booting even if a user command to boot the power is not input. Subsequently, the display apparatus 100 performs pairing with the searched control device (S760).

However, if there is a pairing record regarding the searched control device in the pairing history (S740-Y), the display apparatus 100 does not perform booting automatically and instead performs booting (S750) when a booting command is input from the searched control device (S770-Y). If a booting command is not input, the method ends. In other words, because the display apparatus 100 has already been paired with the searched control device, the display apparatus 100 may receive a user command from the control device. Accordingly, if a booting command is input through the control device, the display apparatus 100 performs booting.

As described above, using the controlling method of a display apparatus 100, the display apparatus 100 may perform Bluetooth pairing with a Bluetooth remote processor automatically without an IR receiver. Accordingly, the display apparatus may boot itself without receiving a user command for booting via an infrared channel via a remote controller. Accordingly, the convenience of pairing the display apparatus with a remote control device can be improved.

Although one or more of the examples herein describe a display apparatus automatically performing pairing with a control device the first time the display apparatus is plugged in to A/C power, the examples herein are not limited thereto. As another example, the display apparatus may automatically perform pairing with a newly found control device which the display apparatus has yet to pair with, without a user input, even though the display apparatus has paired with another control device previously. Accordingly, the display apparatus may automatically pair with the newly found control device. For example, the display apparatus may perform a search for a new control device at preset intervals, or in response to a preset event such as a power cord of the display apparatus being plugged into an outlet. If the display apparatus determines it is not paired with a found control device, the display apparatus may automatically pair with the found control device.

The controlling method of a display apparatus according to the above-described various exemplary embodiments may be coded as software and stored in a non-transitory readable medium which may be mounted and used in various apparatuses.

The non-transitory recordable medium refers to a medium which may store data permanently or semi-permanently rather than a medium storing data for a short time. For example, the non-transitory recordable medium may be a CD, DVD, hard disk, Blu-ray disk, USB, memory card, ROM, etc.

The foregoing embodiments and advantages are merely for purposes of example and are not to be construed as limiting of the present invention. The present teaching can be readily applied to other types of apparatuses. Also, the description of the exemplary embodiments is intended to be illustrative, and not to limit the scope of the claims, and it should be appreciated that alternatives, modifications, and variations will be apparent to those skilled in the art.

What is claimed is:

1. A display apparatus comprising:
a storage;
a communicator;
a power supply connectable to an AC power source for supplying AC power to the display apparatus; and
a processor configured to:
in response to the power supply being connected to the AC power source, control the communicator to search for a connectable control device,
in response to the connectable control device being found as a result of the search, determine whether a pairing history of the connectable control device is stored in the storage, in response to determining that the pairing history of the connectable control device is not stored in the storage, automatically boot an operating system without a user boot command and perform pairing with the connectable control device based on a user command for pairing with the connectable control device, and in response to determining that the pairing history of the connectable control device is stored in the storage, perform pairing with the connectable control device based on the pairing history.

2. The display apparatus as claimed in claim 1, further comprising:

a display, wherein the processor is configured to control the display to display a user interface (UI) indicating that the display apparatus is performing pairing with the connectable control device while the display apparatus is being booted.

3. The display apparatus as claimed in claim 1, wherein the processor comprises:

a sub processor; and a main processor, wherein, in response to the AC power being applied to the display apparatus through the power supply, the sub processor is configured to transmit information about a pairing history of the connectable control device to the main processor, and in response to determining that there is no pairing history of the connectable control device based on the information received from the sub processor, the main processor is configured to boot the display apparatus.

4. The display apparatus as claimed in claim 1, wherein the control device comprises a Bluetooth remote controller, and the processor is configured to perform a Bluetooth pairing with the connectable control device to perform Bluetooth communication.

5. A controlling method of a display apparatus, the method comprising:

in response to a power supply connectable to an AC power source for supplying AC power to the display apparatus being connected to the AC power source, searching for a connectable control device;

in response to the connectable control device being found as a result of the search, determining whether a pairing history of the connectable control device is stored in a storage of the display apparatus;

in response to determining that the pairing history of the connectable control device is not stored in the storage, automatically booting an operating system without a user boot command and performing pairing with the connectable control device based on a user command for pairing with the connectable control device; and in response to determining that the pairing history of the connectable control device is stored in the storage, performing pairing with the connectable control device based on the pairing history.

6. The method as claimed in claim 5, further comprising displaying a user interface (UI) indicating that the display apparatus is performing pairing with the connectable control device while the display apparatus is being booted.

7. The method as claimed in claim 5, wherein in response to the AC power being applied to the display apparatus, power is applied to a sub processor, information about the pairing history of the connectable control device is transmitted to a main processor by the sub processor, and, in response to the main processor receiving information that there is no pairing history of the connectable control device, the display apparatus is booted by the main processor.

8. The method as claimed in claim 5, wherein the control device comprises a Bluetooth remote controller, and the performing pairing comprising performing Bluetooth pairing to perform Bluetooth communication with the connectable control device.

9. A display system, comprising:

a control device configured to control an electronic apparatus via Bluetooth communication; and a display apparatus configured to:

search for a connectable control device in response to a power supply connectable to an AC power source for supplying AC power to the display apparatus being connected to the AC power source, in response to the connectable control device being found as a result of the search, determine whether a pairing history of the connectable control device is stored in a storage of the display apparatus, in response to determining that the pairing history of the connectable control device is not stored in the storage, automatically boot an operating system without a user boot command and performing pairing with the connectable control device based on a user command for pairing with the connectable control device, and in response to determining that the pairing history of the connectable control device is stored in the storage, perform pairing with the searched connectable device based on the pairing history.

10. The system as claimed in claim 9, wherein, in response to the AC power being supplied for the first time, the display apparatus is configured to store information indicating that there is no pairing history of a control device, and in response to the connectable control device being searched, perform booting and perform pairing with the connectable control device.

11. The system as claimed in claim 9, wherein the control device comprises a Bluetooth remote controller, and the display apparatus performs Bluetooth pairing with the control device.

12. A display apparatus comprising:

a storage;

a communicator;

a processor; and a power supply configured to initially power the processor prior to booting of the display apparatus, wherein the processor is configured to:

in response to the power supply connectable to an AC power source for supplying AC power to the display apparatus being connected to the AC power source, control the communicator to search for a remote control device, in response to the remote control device being found as a result of the search, determine whether the remote control device is previously paired with the display apparatus, in response to determining the remote control device having not previously paired with the display apparatus, automatically boot an operating system without a user boot command and perform pairing with the remote control device based on a user command for pairing with the remote control device, and in response to determining the remote control device having previously paired with the display apparatus, perform pairing with the searched remote control device based on a pairing history of the remote control device.

13. The display apparatus of claim 12, wherein the processor is further configured to determine whether the remote control device has previously paired with the display apparatus based on a pairing history of the remote control device.

14. The display apparatus of claim 12, wherein the power supply is configured to initially power the processor without supplying power to a display of the display apparatus.

15. The display apparatus of claim 12, wherein the processor is configured to perform the pairing operation with the remote control device via Bluetooth communication.

16. The display apparatus of claim 12, wherein the display apparatus receives a user input via an infrared (IR) channel.

* * * * *